May 6, 1969 M. VECCHIO ET AL 3,442,962
PROCESS FOR THE PRODUCTION OF FLUOROCHLOROMETHANES
Filed March 21, 1966
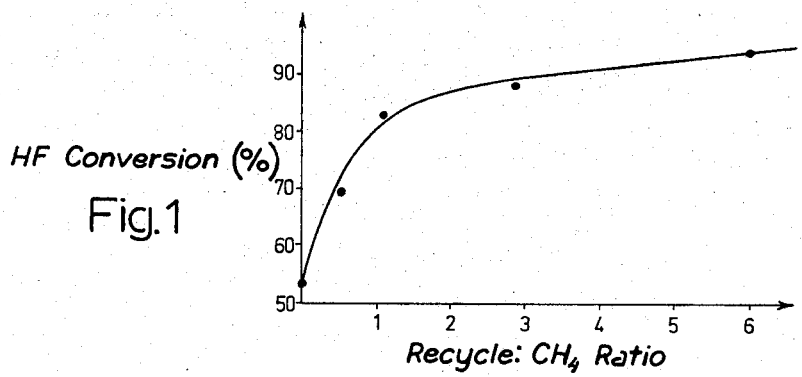
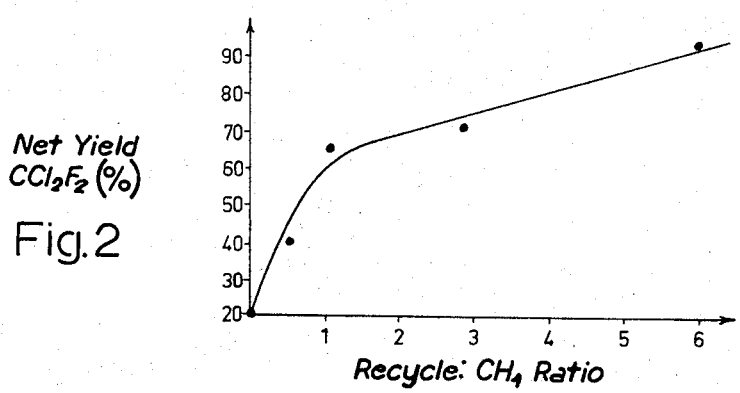
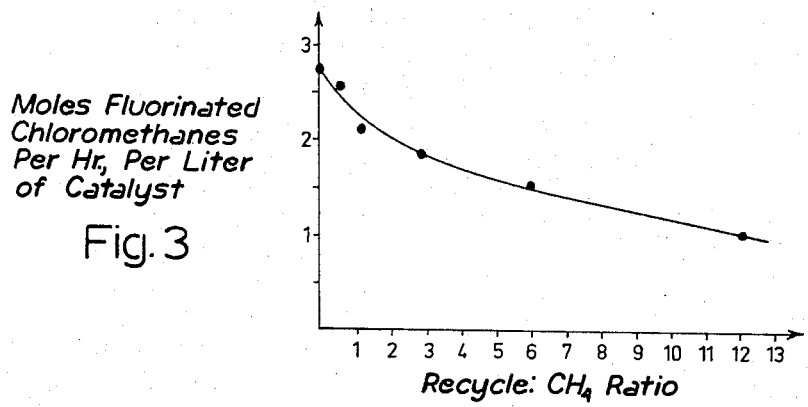
Martino Vecchio
Italo Cammarata
Luciano Lodi
INVENTORS.
BY
Karl F. Ross
Attorney United States Patent Office 3,442,962
Patented May 6, 1969

3,442,962
PROCESS FOR THE PRODUCTION OF
FLUOROCHLOROMETHANES
Martino Vecchio, Italo Cammarata, and Luciano Lodi,
Milan, Italy, assignors to Montecatini Edison S.p.A.,
Milan, Italy, a corporation of Italy
Filed Mar. 21, 1966, Ser. No. 536,596
Int. Cl. C07c 17/10
U.S. Cl. 260—653.7                                    4 Claims

ABSTRACT OF THE DISCLOSURE

A continuous process for the conversion of methane into monofluorotrichloromethane and dichlorodifluoromethane by continuously passing a stream of methane, chlorine, hydrogen fluoride and from 1 to 15 moles per mole of methane of a recycle mixture of at least partially chlorinated and of partially fluorinated methanes consisting predominantly of $CCl_4$, $CFCl_3$, $CHCl_3$, $CH_2Cl_2$, $CHCl_2F$, the proportion of $CCl_4$ and $CFCl_3$ amounting together to at least 60% by weight of the mixture, the molar hydrogen-fluoride:methane ratio being up to substantially 2:1, through a reaction zone over a solid chlorination-fluorination catalyst at a temperature ranging between 180° and 700° C. and for a catalyst-contact time between 0.1 and 30 seconds and continuously separating the reaction-products mixture into a recycle mixture, substantially equal in amount and composition to the recycle mixture passed over the catalyst together with methane, chloride, and hydrogen fluoride, and into a recovered product consisting essentially of the desired mono- and difluorochloromethanes.

---

This application is a continuation in part of our applications Ser. No. 219,777, filed Aug. 27, 1962, (now abandoned), Ser. No. 294,250, filed July 11, 1963, (now U.S. Patent No. 3,294,852), Ser. No. 367,895, filed May 15, 1964, and Ser. No. 461,884, filed June 7, 1965 (both now abandoned).

The aforementioned copending applications relate to continuous processes for the production of fluorine-containing completely halogenated methanes, namely, chlorofluorinated methanes, by the continuous reaction of nonhalogenated methane with chlorine and hydrogen fluoride in the presence of a catalyst and of at least one halogenated hydrocarbon, preferably having a skeleton similar to that of the nonhalogenated hydrocarbon, whose function and effectiveness will be discussed in greater detail hereinbelow.

It has already been proposed to carry out a fluorination of chlorinated organic compounds both in liquid- and vapor-phase reactions. Thus a liquid-phase reaction can involve the refluxing, under pressure, of a mixture of hydrogen fluoride (HF) with a halogenated organic compound, e.g., halogenated aliphatic hydrocarbons of the chloromethane type, in the presence of antimony halides. The vapor-phase processes practiced heretofore involve the passing of a mixture of hydrogen fluoride and one or more halogenated organic compounds over catalysts generally chosen from among the aluminum, chromium, zirconium and thorium fluorides. Both the liquid-phase and the vapor-phase processes require halogenated organic compounds as the starting material and may be considered, in part, to involve the replacement of a higher halogen such as chlorine with fluorine. The starting material must, in turn, be produced by halogenation (e.g., thermal chlorination) of nonhalogenated hydrocarbons.

It has also been suggested that it is possible to obtain fluorinated organic derivatives by passing a mixture of hydrogen fluoride, chlorine and methane over a chromium fluoride catalyst. Although this process requires only convenient starting materials, there is no overall improvement in the economy of the process as compared with those mentioned earlier since the reaction velocity in the latter case is extremely slow and catalyst-contact times of about 3 minutes are required to obtain any appreciable yields; moreover, the yield per unit of catalyst volume or weight employed is extremely small in spite of the long contact times.

Other gas-phase processes required the presence of oxygen in the gas mixture, and thereby give rise to the formation of water, the presence of this substance being disadvantageous as a consequence of the increased corrosion of the apparatus used for carrying out the reaction; furthermore the resulting yields are very low.

The prior concepts in this field can be considered together in terms of their inherent disadvantages. For example, appreciable reaction rates could be obtained heretofore only when the more expensive, halogenated hydrocarbons served as the starting material. When non-halogenated hydrocarbons were employed at lower cost for this starting material, a reduced reaction rate and a low catalyst utilization increased the cost in other respects; the most desired products (e.g., $CCl_3F$ and $CF_2Cl_2$) were, moreover, obtained in relatively low yields. It has now been found, as set forth in the aforementioned copending applications, that it is possible to obtain fluorinated organic compounds and especially chlorofluorinated methanes with very high reaction velocities or rates and with excellent yields, by a process which involves the recycling of one or more halogenated hydrocarbons from the product mixture to the reaction mixture to serve as a reaction promoter and modifier and also to be brought to the desired level of halogenation in the reaction zone.

It is, therefore, an important object of the present invention to provide a process for the production of fluorinated hydrocarbons in general, and completely chlorofluorinated methanes in particular, which extends the principles first set forth in our copending applications mentioned above and permits the continuous reaction of nonhalogenated methane in the vapor phase with high yields and reaction rates.

Another object of the present invention is to provide a process for the chlorofluorination of methane which permits the recovery of halomethanes having all of their hydrogen atoms replaced by fluorine or by fluorine and chlorine while passing through the reaction system.

It is still another object of this invention, constituting a departure from the possibilities of prior techniques in this field, to obtain selectively or preferentially chlorofluorinated compounds, i.e., monofluorotrichloro, dichlorodifluoro and trifluoromonochloro derivatives, from nonhalogenated methane.

Still another object of our invention is to provide a relatively simple and highly economical process for producing chlorofluorinated products with a high ratio of desired products to catalyst employed as may be deduced, for example, from the low contact times.

A more specific object of the instant invention is to provide a process of the character described which allows the gas-phase reaction temperature to be conveniently and effectively controlled although the reaction may be highly exothermal.

Still another object of this invention is to provide a process for the chlorofluorination of methane which can be selectively directed toward the optimum production of one or another chlorofluorinated compound by regulating certain parameters of the recycling stream.

These objects and others which will become apparent hereinafter are attained, in accordance with the present invention, via a process involving the admixture with the nonhalogenated methane of at least one halogenated hydrocarbon recycled from the product mixture and present in an amount preferably comparatively large with respect to the molar quantity of the strating nonhalogenated methane.

The recycled portion of the effluent at the product side of the reaction zone, including chlorinated methanes as well as chlorofluorinated hydrocarbons, functions not only as a temperature-controlling diluent and reaction participant but also, for reasons not wholly understood, as a reaction promoter markedly increasing the reaction rate and conversion yield to a surprisingly and unexpectedly high degree.

In its broadest aspects, the present invention comprises a process for the production of predetermined chlorofluorinated methanes from nonhalogenated methane which involves the steps of passing methane over a fluorination catalyst used alone or together with a chlorination catalyst in at least one reaction zone maintained at a temperature between substantially 180° C. and 700° C., together with hydrogen fluoride and chlorine for a catalyst-contact time between substantially 0.1 and 30 seconds and in the presence of at least one of the aforementioned recycled halogenated hydrocarbons to fluorinate the methane, the recycled compounds being present in a molar quantity in the range from 0.5 to 15 per mole of nonhalogenated (i.e., "starting") methane; the product mixture removed from the reaction zone consists mainly of chlorinated and chlorofluorinated methanes which are separated so that a quantity of halogenated recycled hydrocarbons equal to that admixed with the reactants can be returned to the reaction zone and the process continued.

By the contact time is meant the ratio between the catalyst volume, measured by reading the volume occupied by the catalyst when inserted in the reactor or in a graduated glass cylinder, and the volume of the reactant gases fed to the reaction zone per second in accordance with the relationship:

$$\text{contact time} = \frac{\text{volume of catalyst}}{\text{gas volume/second}}$$

The catalyzing agent for the reaction can be any of the conventional fluorination catalysts, as well as the more specific ones set forth in commonly assigned U.S. Patent No. 3,183,276, issued May 11, 1965 to Martino Vecchio, one of the present joint inventors. The catalyzing agents for the reaction can be any of the above mentioned fluorination catalysts used alone or associated with any of the conventional chlorination catalysts. Examples of useful catlaysts are oxides or salts and particularly fluorides and chlorides of Cr, Ni, Co, Al, Ga, V, Zr, Th, Zn, Fe, Pd, Cu, Bi, Pb, and their mixtures.

The catalyst, which is preferably in a solid state, may be used alone or on a suitable carrier in a fixed, mobile or fluid bed. Examples of suitable carriers are active carbon, aluminas, fluorinated aluminas and barium sulphate. Those catalysts which are impregnated into or distributed on solid supports preferably having inherent catalytic activity, such as activated carbons and fluorinated aluminas, are, according to this invention, preferably activated by a heat treatment in the presence of a gas at a temperature between substantially 200° C. and 700° C.

While generally the temperature range of substantially 180° C. to 700° C. is effective as indicated earlier, when using a single reaction zone it is preferred to operate within a range of substantially 400° C. to 500° C. since at the lower temperatures (e.g. below 250° C.) the reaction rate falls off in accordance with the reaction kinetics while at higher temperatures (e.g., above 700° C.) there appears to be a tendency toward decomposition of the organic compounds and the deposition of carbonaceous residues on the surface of the catalyst with consequent lowering of its catalytic activity. One of the significant improvements of this invention over conventional system employing nonhalogenated hydrocarbons as the starting material is that a relatively prolonged contact time on the order of minutes is required in the prior process, whereas the method of the present invention, in spite of a dilution of the nonhalogenated hydrocarbon, permits low contact times and, moreover, gives optimum results at contact times between 1 and 10 seconds, although acceptable yields of fluorinated products are obtained when the contact time is increased to as long as 30 seconds or reduced to 0.1 second. It has been noted that generally, within the stated range, the longer the contact time, the greater is the degree of fluorination.

The raw material, which is converted into fluorinated and chlorofluorinated methanes by the process according to this invention, is methane. The halogenated hydrocarbons recycled from the product side of the reaction zone to the reactant side can thus be the chlorinated and/or chlorofluorinated derivatives of methane; when operating continuously, quantities of some other products (such as for example tetrachloroethylene, hexachloroethane, perchlorobutadiene, hexachlorobenzene) may be used in addition. In general, however, it may be stated that the composition of the recycled halogenated hydrocarbon mixture determines the composition of the mixture on the product side of the reaction zone and thus the predominant product, thereby enabling the distribution of the principal products to be varied, e.g., by modification of the molar ratio of the several halogenated hydrocarbons forming the recycled mixture. It may further be stated that, according to the present invention, as long as the desired conversion of the nonhalogenated methane is maintained at the product side with the desired product predominating, the composition of the recycling mixture will remain unchanged. Thus the recycling mixture, which is present preferably in a large amount by comparison with the quantity of the methane introduced, functions as a temperature-controlling or temperature-dissipating agent and as a product-controlling medium. The term "halogenated hydrocarbon" as used herein is intended to identify hydrocarbons having at least one atom of chlorine or fluorine. It has, however, been found that satisfactory results are obtained when the recycling mixture consists predominantly of one or more of the following compounds: $CCl_4$, $CHCl_3$, $CH_2Cl_2$, $CFCl_3$ and $CHCl_2F$. The following additional halogenated hydrocarbons may, effectively, also be present in the recycling mixture although, in general, they will constitute less than a major portion of the substances recycled: $CH_3Cl$, $CHF_3$, $CF_2Cl_2$, $CF_3Cl$, $CHF_2Cl$, $C_2Cl_6$, $C_2Cl_4$, $C_6Cl_6$ and perchlorobutadiene. To obtain the best results, however, it is necessary that the $CCl_4$ and/or $CFCl_3$ be present in amounts greater than that of any other component of the recycling mixture. In many cases the most significant results from the point of view of the economics of the reaction were obtained when $CCl_4$ plus $CFCl_3$ represented more than 60% by weight of the recycling mixture.

The recycling mixture can also include one or more inert compounds as well as byproducts of the reaction; thus the recycling mixture can include, for example, some hydrogen chloride produced as a byproduct of the chlorofluorination reaction. In carrying out the reaction, it has been found particularly advantageous to combine the recycling mixture first with molecular chlorine and then with the hydrogen fluoride, the nonhalogenated methane serving as the starting material; however, this order of combination of the various components is not imperative.

It has been noted that at molar ratios of the recycling mixture of chlorinated and chlorofluorinated hydrocarbons and the nonhalogenated methane as low as 0.5 the process according to the present invention may still be carried out although some disadvantages, even if only of secondary importance, may result. So it has been observed that a rapid catalyst aging and a consequent poor conversion of hydrogen fluoride take place. Because of the reduced quantity of recycling mixture and, consequently, its poor efficiency in dissipating the reaction heat, cooling devices or inert diluents, which are difficult to remove from the desired products, must be used. Perhaps most significantly there is excessive and not always desirable production of very highly fluorinated compounds and a consequent low yield of the lesser fluorinated hydrocarbons; this shift in the orientation of the reaction can be partially avoided only by keeping the conversion of hydrogen fluoride extremely low. At molar proportions of 0.5 or higher (i.e. up to about 15 moles of recycling mixtures per mole of non-halogenated methane), the product contains at least sufficient quantities of the compounds corresponding to those recycled to enable their continuous diversion and reinsertion in the process stream at the reaction zone. There seems not to be an upper limit for the molar ratio between the recycling mixture and the nonhalogenated methane except that arising from economical considerations; nevertheless at molar ratios above about 15:1 there appears to be a reduction in the catalyst utility per unit of nonhalogenated hydrocarbon converted. Thus it is desirable to maintain the molar ratio between the limits of substantially 0.5:1 to 15:1. In fact, at higher ratios there is no improvement in the orientation of the reaction with respect to the desirable end products while there is a necessity for greater plant capacity to process the higher quantities of gases necessary in addition to other obvious inconveniences. In general, therefore, the recycled hydrocarbons should constitute, in terms of molar quantities, a substantial fraction of the total fluorinatable hydrocarbon (i.e., nonhalogenated hydrocarbon+recycled mixture) fed to the reaction zone or zones. Satisfactory results are obtainable within this range at molar ratios between upwards of substantially 1:1 to 10:1, depending upon the desired product, the molar-ratio range of 3:1 to 8:1 being preferred. As will be apparent from the above-identified applications, moreover, a molar-ratio range of 5.7:1 to 6.2:1 and a contact-time range of 1.2 seconds to 2.5 seconds yield excellent results.

According to still another feature of the present invention, the gas-phase transformation of nonhalogenated methane into chlorofluorinated methanes is carried out in two reaction zones maintained at different temperatures within the range of 180° C. to 700° C.

It has been found that, according to this aspect of the invention, the subdivision of the reaction into successive reaction zones maintained at different temperatures (at least two such zones being required) not only affords a better catalyst utilization but also permits a more complete control of the composition of the products as will become apparent hereinafter. In fact, it appears that the subdivision of the process into at least two reaction stages, in one of which the reaction is carried out over an active fluorination catalyst used alone or together with a chlorination catalyst at a temperature between substantially 180° C. and 350° C. and preferably, between 200° C. and 250° C., permits a certain degree of separation between the reactions resulting principally in fluorination of the chloromethanes and those primarily involving chlorination; the latter reaction predominates in the other reaction stage in which the temperature is maintained between substantially 350° C. and 500° C. and which can include a chlorination catalyst but is also effective when the "catalyst" has little or no effectiveness in promoting the reaction except to provide a large contact-surface area. Moreover, the present invention, according to this aspect thereof, permits the use of catalysts which are temperature sensitive for at least part of the process. Thus, e.g., a catalyst which has high temperature stability but a rather low catalytic capacity in promoting fluorination can be employed in the high-temperature reaction zone while a thermally less stable compound having a high fluorination capability is used in the lower-temperature zone.

According to the present invention the reactants are preferably passed through the higher-temperature zone and thereafter through the lower-temperature zone, although a reverse order of flow can also be used albeit with somewhat less effectiveness. It may be noted that some catalysts, when used in a one-zone process, have a tendency to orient the reaction products along certain lines while the same catalysts are characterized by somewhat different product mixtures when used in a two-stage process. This distinction accounts for the multiple possibilities for exploitation of the heretofore known fluorination and chlorofluorination catalysts by the process of the instant invention.

Whereas even inert materials, preferably in a finely divided state, may be employed in the high-temperature zone, it is advantageous when these catalysts are capable of the selective adsorption of chlorine to promote the chlorination of the hydrocarbons passed therethrough. Thus, activated carbon, metal halides (especially chlorides) and mixtures of such halides and compositions containing metal halides and activated carbons yield the best results. Activated carbons such as peat charcoal, animal charcoal and vegetable carbon blacks are all suitable for this purpose; the solid materials can be used in the form of powders, shavings, filings, chips, etc. while the activated carbon can be commercially available comminuted charcoals and the like.

The catalysts found to be most advantageous in the low-temperature reaction zone are those found to be advantageous in the single-zone proces described previously, i.e., the supported and unsupported oxides and salts of chromium, cobalt, nickel, aluminum, thorium, zirconium, gallium, vanadium, zinc, iron, copper, bismuth, lead and palladium and especially their fluorides or oxyfluorides. The oxides fluorides and oxyfluorides can be advantageously dispersed in and upon supports of alumina, fluorinated alumina, actviated carbon or barium sulphate.

The lower-temperature reaction zone can be progressively increased in temperature as the catalyst is consumed or rendered inoperative; thus, an initial reaction temperature of 180° C. can be employed, this tempertuire being progressively increased as necessary up to the levels indicated in connection with the process utilizing a single reaction zone.

The product mixture leaving the reaction zone or zones thus contains, in addition to the desired product or products and the reaction-controlling medium (i.e., the hydrocarbon mixture recycled to the reaction zone), alkali-fixable components such as hydrogen chloride (produced during the reactions) and, occasionally, residual hydrogen fluoride and chlorine. Small quantities of excessively fluorinated compounds may also be present. The expression "alkali fixable" is used herein to denote those substances which can react with alkali (e.g., NaOH, KOH, $Na_2CO_3$) in aqueous medium to produce soluble products or precipitates and thereby are removed from the product stream. "Water-soluble compounds" include those substances which are soluble in water with or without an alkali fixation and can be removed from the product stream by washing with water. The product stream can also contain residual methane or other substances which have a relatively low boiling point, by comparison with the chloro and fluorochloro hydrocarbons predominantly produced in the reaction zone, and are thus less readily condensable upon cooling. Usually the separation of the reaction products, which form the mixture of the recycled halogenated hydrocarbons, is carried out by distillation.

Because of the high value of the condensation heat of the vapors of the fluorinated and chloro-fluorinated organic compounds contained in the reaction mixture, we have found it desirable to carry out the distillation under pressure.

This pressure distillation becomes the more profitable the higher the pressure is kept, since the high-pressure conditions permit the use of very inexpensive cooling means for cooling the top of the stripping column, e.g., water. In order to carry out the distillation under high pressure, it is necessary to compress the gas mixture originating from the reaction by means of a compressor. The compressor would have to be built of a special material resistant to the highly corrosive gases present in the gaseous flow coming from the reaction apparatus, e.g., HCl, HF, $Cl_2$ etc. The use of such equipment having special qualities of chemical resistance may constitute a drawback, which can be easily overcome by carrying out the gas-phase transformation of methane into fluorinated methane at a pressure higher than atmospheric pressure and preferably lying between 2 and 15 kg./cm.$^2$.

The reaction gases thus obtained are conveyed, still under pressure, to a distillation column, at the top of which such gases are partially condensed by cooling.

When operating according to this feature of the invention, the gases coming from the reactor, and which are introduced into the distillation column, are already under such pressure conditions that a simple cooling down, for instance by cold water or by brine, depending on the pressure of the gases, is sufficient for obtaining the partial condensation of the reaction products.

By following these procedures, the compression phase of the reaction gases at the outlet of the reactor, usually required when operating at atmospheric pressure, is eliminated since such gases are already at the pressure condition suitable for being partially condensed in the distillation column.

Thus, the necessity of resorting to the use of compressors made of materials of very high chemical resistance is eliminated.

As indicated above, the gases which react, that is, hydrofluoric acid, chlorine, methane and the recycling mixture, may be easily and without trouble fed to the reactor under pressure. In fact, chlorine and hydrofluoric acid may be supplied in liquid phase by conventional pumps. Methane is compressed to the required pressure by means of a suitable conventional compressor, owing to the non-corrosive nature of the methane itself, while the recycling mixture coming from the bottom of the distillation column, which is already at the pre-established operating pressure, may be supplied by means of a common pump.

It has been found that carrying out the process of the invention according to this particular feature offers many advantages.

The distillation of the reaction process will take place at such a pressure that it will be sufficient to use very inexpensive means for cooling the top of the stripping column.

The separation of the useful products from the mixture of recycling products is facilitated and simplified while avoiding the need for compressors built of specially highly resistant material. Furthermore a vary high productivity of fluorinated and chlorofluorinated methanes per volume unit of catalyst is reached. When operating according to this specific feature of the invention it is also possible to obtain higher conversion of the reactants with higher yields in the desired products even with exceptionally short contact times.

It has also been found that it is particularly convenient to combine the above stated procedure, according to which it is possible to carry out the chlorofluorination of methane in two separated catalysis zones, operating at different temperatures, with the procedure relating to the superatmospheric pressure and thus obtain all the advantages which are peculiar to each of these procedures.

EXAMPLE I

Into a fluid-bed reactor, which contained 218 cc. of catalyst (consisting of fluorinated alumina impregnated with 10% by weight of $ThF_4$) and to which a mixture of halogenated hydrocarbons was recycled continuously, a mixutre of hydrogen fluoride, chlorine and methane was fed. At the reactor outlet the products were separated in a continuous manner from the mixture to be recycled and chromatographically analyzed.

The reaction was carried out at 470° C. with a contact time of 1.99 seconds. The composition of the mixture of halogenated hydrocarbons which was recycled continuously was approximately the following:

|  | Mole percent |
|---|---|
| $CCl_4$ | 80.4 |
| $CHCl_3$ | 6.0 |
| $CH_2CL_2$ | 0.8 |
| $CFCl_3$ | 12.7 |

The molar ratios of the reactants and of the mixture of halogenated hydrocarbons to be recycled were as follows:

Recycled mixture: $Cl_2$:HF:$CH_4$=5.9:4.4:1.7:1

The conversions of the reactants were the following:

|  | Percent |
|---|---|
| $CH_4$ | 97.4 |
| $Cl_2$ | 85.3 |
| HF | 98.9 |

The obtained products and the yields computed on the converted $CH_4$ were as given below.

|  | Percent |
|---|---|
| $CF_3Cl$ | 9.5 |
| $CF_2Cl_2$ | 73.5 |
| $CFCl_3$ | 15.9 |

The particle size of the catalyst was about 80 to 325 mesh and the reactor was an Inconel reactor tube contained in an electrically heated furnace. The reactor was equipped with two thermocouples suitably inserted into the catalyst at distances one third and two thirds across the catalytic zone. At the inlet side of the reactor the mixture of methane, chlorine, hydrogen fluoride, and the recycling mixture of halegenated hydrocarbons of the compositions given above and also shown in the accompanying table were supplied.

At the outlet side of the reactor, prior to analysis, the gaseous products of the reaction were fed into a stripper where the separation by condensation of the mixture of halogenated hydrocarbons was effected. Said mixture, in the steady state, was in the same amount and had the same composition as the recycling mixture and was recycled to the inlet side of the reactor as previously described. The residual gaseous products were passed successively through a water scrubber and a NaOH-solution scrubber to remove HF, chlorine and HCl; they were then passed through a dryer containing $CaCl_2$ and finally metered and analyzed. The weight-percent composition of the recycling mixture, from which the mole percents above were calculated, are also given in the table.

EXAMPLE II

In this experiment, 255 cc. of a catalyst similar to that referred to in the preceding EXAMPLE was used.

The molar composition of the recycling mixture, approximately calculated from the weight-percent values, was:

|  | Mole percent |
|---|---|
| $CCl_4$ | 81.9 |
| $CHCl_3$ | 8.9 |
| $CH_2Cl_2$ | 0.9 |
| $CH_3Cl$ | 2.0 |
| $CFCl_3$ | 6.1 |

The molar ratios of the reactants and the halogenated hydrocarbons in the organic recycling mixture were as follows:

Recycled mixture: $Cl_2$:HF:$CH_4$=6.1:4.6:1.7:1

The contact time was 2.5 seconds and the reaction temperature was 420° C.

The conversion of the reactants were:

| | Percent |
|---|---|
| $CH_4$ | 94.1 |
| $Cl_2$ | 82.0 |
| HF | 99.5 |

The products obtained and the yields computed on the converted $CH_4$ are given in the table:

| | Percent |
|---|---|
| $CF_3Cl$ | 1.8 |
| $CF_2Cl_2$ | 84.2 |
| $CFCl_3$ | 13.6 |

EXAMPLE III

The reaction was carried out with 287 cc. of a catalyst similar to that used in Example I.

The composition (calculated from the weight-perment data of the table) of the recycled mixture was the following:

| | Mole percent |
|---|---|
| $CCl_4$ | 76.3 |
| $CHCl_3$ | 14.2 |
| $CH_2Cl_2$ | 1.2 |
| $CH_3Cl$ | 2.3 |
| $CFCl_3$ | 6.0 |

The molar ratios of the reactants and the halogenated hydrocarbons in the organic recycled mixture were the following:

Recycled mixture: $Cl_2$:HF:$CH_4$=5.9:4.7:1.4:1

The contact time was 2.4 seconds and the reaction temperature was 400° C.

The conversions of the reactants were the following:

| | Percent |
|---|---|
| $CH_4$ | 93.4 |
| $Cl_2$ | 78.6 |
| HF | 99.8 |

The obtained products and the yields computed on converted $CH_4$ were as follows:

| | Percent |
|---|---|
| $CF_3Cl$ | 0.9 |
| $CF_2Cl_2$ | 48.1 |
| $CFCl_3$ | 50.2 |

EXAMPLE IV

The catalyst was constituted of 320 cc. of carbon with a particle size comprised between 60 and 100 mesh and impregnated with 30% by weight of $ThF_4$. The recycling mixture had approximately the following molar composition (calculated from the values of the table):

| | Mole percent |
|---|---|
| $CCl_4$ | 58.9 |
| $CFCl_3$ | 40.8 |
| $CHCl_3$ | 0.1 |
| $C_2Cl_4$ | 0.2 |
| $CF_2Cl_2$ | 0.1 |

The recycling mixture and the reactants were fed in the following ratios:

Recycled mixture: $Cl_2$:HF:$CH_4$=6.2:4:1.3:1

The contact time was 1.9 seconds and the reaction temperature was 460° C.

The conversions of the reactants were as follows:

| | Percent |
|---|---|
| $CH_4$ | 96.7 |
| $Cl_2$ | 95.7 |
| HF | 92.6 |

The products obtained and the net yields computed on the converted methane, as tabulated, were the following:

| | Percent |
|---|---|
| $CF_3Cl$ | 0.1 |
| $CF_2Cl_2$ | 15.6 |
| $CFCl_3$ | 84.1 |

EXAMPLE V

The reaction is carried out with 322 cc. of fluorinated alumina, of a particle size of 60 to 100 mesh, impregnated with 20% of cobalt fluoride. The approximate composition (calculated from the tabulated data) of the recycled mixture was as follows:

| | Mole percent |
|---|---|
| $CCl_4$ | 84.5 |
| $CFCl_3$ | 7.7 |
| $CHCl_3$ | 6.3 |
| $CH_2Cl_2$ | 0.7 |
| $C_2Cl_4$ | 0.6 |
| $C_2Cl_6$ | 0.1 |

The molar ratios of the reactants and the recycled organic mixture were as follows:

Recycled mixture: $Cl_2$:HF:$CH_4$=5.7:4.1:1.7:1

The contact time was 2 seconds and the reaction temperature was 470° C.

The conversion of the reactants was as follows:

| | Percent |
|---|---|
| $CH_4$ | 99 |
| $Cl_2$ | 96 |
| HF | 98 |

The products obtained and the yields as calculated based on the converted methane were as follows:

| | Percent |
|---|---|
| $CF_3Cl$ | 8 |
| $CF_2Cl_2$ | 48 |
| $CFCl_3$ | 43 |

EXAMPLE VI

In this experiment 320 cc. of a catalyst constituted of peat coal with a particle size comprised between 35 and 65 mesh, impregnated with a mixture of fluoride and chloride of chromium, was used. The analytic composition of the catalyst was the following by weight:

C=90%, Cr=4.4%, Cl=1.4%, F=4.2%

The recycling mixture had approximately the following composition (generally calculated from the weight-percent values of the table):

| | Mole percent |
|---|---|
| $CCl_4$ | 57.9 |
| $C_2Cl_6$ | 0.1 |
| $CH_2Cl_2$ | 0.1 |
| $CHCl_3$ | 0.2 |
| $C_2Cl_4$ | 0.5 |
| $CFCl_3$ | 41.1 |
| $CF_2Cl_2$ | 0.1 |

The molar ratios of the reactants and of the organic recycled mixture were as follows:

Recycled mixture: $Cl_2$:HF:$CH_4$=5.8:4.1:1.53:1

The contact time was 2 seconds and the reaction temperature was 470° C.

The conversions of the reactants were the following:

| | Percent |
|---|---|
| $CH_4$ | 99.2 |
| $Cl_2$ | 96.5 |
| HF | 97.2 |

The products obtained and the yields as computed on methane conversion were as follows:

| | Percent |
|---|---|
| $CF_3Cl$ | 0.6 |
| $CF_2Cl_2$ | 47.7 |
| $CFCl_3$ | 51.6 |

EXAMPLE VII

The reaction was carried out using 190 cc. of a catalyst constituted of a mechanical mixture of active carbon of a particle size comprised between 35 and 65 mesh and fluorinated alumina with a particle size comprised between 65 and 100 mesh.

The fluorinated alumina constituted 20% by weight of the mixture. The test was carried out at 470° C. and with a contact time of 1.2 seconds. The composition of the recycled mixture was as follows (approximately as calculated from the weight-percent values of the table):

| | Mole percent |
|---|---|
| $CCl_4$ | 78.42 |
| $CHCl_3$ | 0.24 |
| $CH_2Cl_2$ | 0.10 |
| $C_2Cl_4$ | 0.74 |
| $C_2Cl_6$ | 0.05 |
| $CFCl_3$ | 20.12 |
| $CF_2Cl_2$ | 0.12 |

The recycled mixture and the reactants were fed with the following molar ratios:

Recycled mixture: $Cl_2:HF:CH_4$=5.78:3.96:1.53:1

The conversions of the reactants were the following:

| | Percent |
|---|---|
| $CH_4$ | 97.6 |
| $Cl_2$ | 98.8 |
| HF | 95.6 |

Products obtained and the net yields as computed on the basis of methane conversion were as follows:

| | Percent |
|---|---|
| $CF_3Cl$ | 0.2 |
| $CF_2Cl_2$ | 51.2 |
| $CFCl_3$ | 48.5 |

EXAMPLE VIII

The experiment was carried out using as catalyst 322 cc. of fluorinated alumina impregnated with 5.5% of $CrF_3$.

The particle size of the catalyst was comprised between 100 and 115 mesh. The composition (approximate as calculated from the tabulated data) of the recycled mixture was the following:

| | Mole percent |
|---|---|
| $CCl_4$ | 88.07 |
| $CHCl_3$ | 5.76 |
| $CH_2Cl_2$ | 0.68 |
| $CFCl_3$ | 4.13 |
| $C_2Cl_4$ | 1.21 |
| $C_2Cl_6$ | 0.12 |

The recycled mixture and the reactants were fed with the following molar ratios:

Recycled mixture: $Cl_2:HF:CH_4$=6:4.3:1.5:1

The contact time was 2 seconds and the reaction temperature was 470° C. The conversions of the reactants were as follows:

| | Percent |
|---|---|
| $CH_4$ | 99 |
| $Cl_2$ | 92 |
| HF | 98 |

The products and the net yields, based on methane conversions, were as follows:

| | Percent |
|---|---|
| $CF_3Cl$ | 1.5 |
| $CF_2Cl_2$ | 47.8 |
| $CFCl_3$ | 48.9 |

EXAMPLE IX

The catalyst was constituted of 560 cc. of fluorinated alumina with particle sizes comprised between 80 and 100 mesh, and the process was carried out at the temperature (470° C.), with the catalyst-contact time (3.0 seconds) and molar ratios of components, and with the recycled composition shown in the accompanying table; the products, yields and conversions are also shown there.

EXAMPLE X

The catalyst used was constituted by carbon impregnated with aluminum fluoride, activated and fluorinated at 750° C. The reaction was carried out under the tabulated conditions yielding the results given in the table.

EXAMPLES XI AND XII

The catalyst used was constituted by carbon impregnated with aluminum fluoride and the tabulated process parameters were employed.

EXAMPLE XIII

The conditions indicated in the table give the listed results with 450 cc. of vegetal carbon having a granulometry between 35 and 100 mesh (Tyler series) as catalyst.

EXAMPLE XIV 322 cc. of active carbon impregnated with 35% of $AlF_3$ activated in nitrogen atmosphere and fluorinated with hydrogen fluoride were used as catalyst.

EXAMPLE XV 160 gr. of active carbon were impregnated with 176 cc. of an aqueous solution containing 11.3 g. of $ThCl_4 \cdot H_2O$ and 217 g. of $CrCl_3 \cdot 6H_2O$. The mass was dried at 110° C. and then activated in nitrogen atmosphere at 500° C. and fluorinated at 450° C.

322 cc. of this catalyst were used for this example.

EXAMPLE XVI 322 cc. of active carbon 66 to 100 mesh impregnated with 10% $AlF_3$ and activated and fluorinated at 470° C. were used.

EXAMPLE XVII 680 g. of $BaSO_4$ were impregnated with a solution of 1,360 g. of $Al(NO_3)_3 \cdot 9H_2O$ in 2,500 cc. of water.

The mass was dried at 110° C. and heated until disappearance of red gases at 350° C., ground at a granulometry between 42 and 325 mesh, and fluorinated with hydrogen fluoride at 500° C. 350 cc. of this catalyst were used.

EXAMPLE XVIII 1,450 cc. of carbon impregnated with 10% of $AlF_3$ and fluorinated with hydrogen fluoride at 500° C. were used. In this case the yields calculated with respect to converted methane are:

| | Percent |
|---|---|
| CO | 0.2 |
| $CHF_3$ | 0.02 |
| $CClF_3$ | 0.4 |
| $CF_2Cl_2$ | 93.3 |
| $CH_3Cl$ | 1.6 |
| $CHFCl_2$ | 0.9 |
| $CFCl_3$ | 3.4 |

A very small amount of oxygen in the methane accounted for the formation of CO during the reaction.

EXAMPLE XIX

Charcoal in the form of small cylinders impregnated with 10% by weight of $AlF_3$ was activated under nitrogen at 450° C. and under hydrogen fluoride at 500° C.

520 cc. of this catalyst were introduced into a conventional type of reactor for catalytic reactions in fixed bed.

EXAMPLE XX

A mixture of 20% fluorinated alumina and 80% active carbon was used as catalyst.

The yields calculated with reference to converted methane were:

| | Percent |
|---|---|
| $CF_2Cl_2$ | 2.1 |
| $CFCl_3$ | 90.6 |
| $CHFCl_2$ | 4.2 |
| $CH_3Cl$ | 2.1 |

The entry "high boiling" in the table identifies a mixture products having a boiling point above 80° C. and comprising some ten to fifteen compounds, mainly $C_2Cl_4$, $C_2Cl_6$, $C_6Cl_6$, $C_4Cl_6$, $C_2Cl_4H_2$.

EXAMPLE XXI

The catalyst used was constituted by vegetal carbon having a granulometry between 48 and 100 mesh, impregnated with 10% of $FeCl_3$ fluorinated at 200–250° C. with hydrogen fluoride in vapor phase, and then treated for 1 hour at 550° C. with hydrogen fluoride.

The reactor was operated according to the fluid-bed technique.

EXAMPLE XXII

The catalyst consisted of carbon "Lurgi KT4" having a granulometry between 48 and 100 mesh and was impregnated with ammonium metavanadate (14.3% by weight with respect to the carbon) and with 8.65% by weight of oxalic acid (with respect to the carbon); then the catalyst was treated for 2 hours with $N_2$ at 300° C. and fluorinated with hydrogen fluoride in the vapor phase at a temperature between 300° C. and 550° C.

The reactor was operated in accordance with the fluid-bed technique.

EXAMPLE XXIII

In this experiment, the catalyst was constituted by carbon "Lurgi, KT4" having a granulometry comprised between 100 and 160 mesh impregnated with 10% of $CrCl_3$ and 5% of $CuCl_2$, and fluorinated with hydrogen fluoride at a temperature comprised between 150° C. and 250° C. The reactor was operated with the fluid-bed technique.

EXAMPLE XXIV 320 cc. of peat coal having a granulometry between 35 and 65 mesh, impregnated with a mixture of fluoride and chloride of chromium, was used as the catalyst.

The analytic composition of the catalyst was the following, by weight: C=90%; Cr=4.4%; Cl=1.4%; F=4.2%.

EXAMPLE XXV

The reaction was carried out in two reaction zones.

The first zone consisted of a conventional fixed-bed-type Inconel reactor containing 200 cc. of Inconel filings. The second zone consisted of a similar reactor containing 100 cc. of aluminum fluoride. The temperatures and the contact times of the zones, the molar ratios of the raw materials, the molar quantities and weight composition of the recycling mixture (fed to the first zone) and the product yields and conversions are shown in the Table.

EXAMPLE XXVI

Into the first-zone metal reactor (Inconel) containing 240 cc. of a fluid-bed-activated carbon catalyst having a granulometry comprised between 35 and 36 mesh, supported on a porous metal plate, a gaseous mixture of chlorine, hydrogen fluoride and methane and a gaseous mixture of halogenated recycling hydrocarbons were introduced. The starting materials were present in the following molar ratios:

| | |
|---|---|
| Chlorine | 3.9 |
| Hydrogen fluoride | 1.6 |
| Methane | 1 |
| Recycling mixture | 6 |

The recycling mixture had the following composition by weight (see the table):

| | Percent |
|---|---|
| $CCl_4$ | 52.43 |
| $CFCl_3$ | 53.11 |
| $CHFCl_2$ | 0.22 |
| $CH_2Cl_2$ | 0.17 |
| $CHCl_3$ | 0.85 |
| $C_2Cl_4$ | 2.48 |
| $C_2Cl_6$ | 0.70 |

The temperature of the reactor was maintained at 470° C.

The contact time of the gases in the first zone was of 1.5 seconds.

The gaseous mixture from the first zone was then introduced into a second but similar metal reactor containing 118 cc. of a granular fluorinated-alumina catalyst (between about 100 and 115 mesh). The temperature of this second reactor was maintained at about 230° C. The contact time of the gases in this zone was 1 second. On leaving the second reactor the gaseous mixture was conveyed to a stripping column, there the separation of the recycling mixture from the main products and by-products took place. The recycling mixture was then directly recycled into the first reaction zone. The products were washed with an aqueous solution of sodium hydroxide, condensed and analyzed by gas-chromotography.

The conversions thereby obtained were as follows:

| | Percent |
|---|---|
| $CH_4$ | 99.3 |
| HF | 98.8 |
| $Cl_2$ | 97.5 |

The yields of the desired chlorofluorinated products, calculated on the basis of converted methane, were as follows:

| | Percent |
|---|---|
| $CF_3Cl$ | 1.8 |
| $CF_2Cl_2$ | 60.8 |
| $CFCl_3$ | 37.1 |

The process was continuously carried out for about 1,000 hours, during which time the catalysts did not show any appreciable reduction of activity.

EXAMPLE XXVII

Utilizing the equipment of the preceding example, a gaseous mixture of chlorine, hydrogen fluoride, methane and a recycling mixture was fed first into the lower temperature zone. The starting materials were present in the following molar ratios:

| | |
|---|---|
| Chlorine | 3.82 |
| Hydrogen fluoride | 1.71 |
| Methane | 1 |
| Recycling mixture | 6 |

The recycling mixture had the following composition by weight:

| | Percent |
|---|---|
| $CCl_4$ | 56.23 |
| $CFCl_3$ | 40.25 |
| $CHFCl_2$ | 0.19 |
| $CH_2Cl_2$ | 0.09 |
| $CHCl_3$ | 0.82 |
| $C_2Cl_4$ | 2.24 |
| $C_2Cl_6$ | 0.52 |

The catalyst used in the first zone was fluorinated alumina and this first zone was maintained at a temperature of 230° C. The gaseous ingredients from the first zone were then fed into the second reaction zone containing activated-carbon catalyst and maintained at a temperature of 470° C., the contact times were similar to those of Example 26.

In this run the conversions were as follows:

| | Percent |
|---|---|
| $CH_4$ | 100 |
| HF | 99.2 |
| $Cl_2$ | 97 |

The net yields of the desired chlorofluorinated products, calculated on converted methane, were as follows:

| | Percent |
|---|---|
| $CF_3Cl$ | 3.6 |
| $CF_2Cl_2$ | 75.1 |
| $CFCl_3$ | 21.3 |

EXAMPLE XXVIII

Equipment similar to that of Examples XXV–XXVII was used; the apparatus consisted of a first reactor containing 240 cc. of active carbon (granulometry of 35–60 mesh) maintained at 470° C., and of a second reactor containing 118 cc. of fluorinated alumina impregnated with thorium fluoride (granulometry 100–115 mesh) maintained at 240° C. In the first reactor was introduced a mixture containing chlorine, hydrogen fluoride, methane and a recycling mixture having the following molar ratios:

| | |
|---|---|
| Chlorine | 3.9 |
| Hydrogen fluoride | 1.44 |
| Methane | 1 |
| Recycling mixture | 6 |

The recycling mixture had the following composition in percentage by weight:

| | Percent |
|---|---|
| $CCl_4$ | 40.26 |
| $CF_2Cl_2$ | 0.13 |
| $CFCl_3$ | 53.52 |
| $CHFCl_2$ | 0.02 |
| $CH_2Cl_2$ | 0.06 |
| $CHCl_3$ | 0.74 |
| $C_2Cl_4$ | 4.12 |
| $C_2Cl_6$ | 1.06 |

The contact time of such gases in the first reactor was 1.5 seconds, after which the gases were transferred to the second reactor, where they remained for one second. The recycling mixture of the above-quoted composition was then removed from the finished reaction products by partial condensation. The resulting product was as follows:

Net yield based upon the converted methane:

| | Percent |
|---|---|
| $CF_3Cl$ | 0.66 |
| $CF_2Cl_2$ | 54.52 |
| $CFCl_3$ | 44.53 |

The conversions were the following:

| | Percent |
|---|---|
| $CH_4$ | 99 |
| $Cl_2$ | 96 |
| HF | 98 |

After 3,500 hours of continuous operation the catalyst did not show any decrease of activity whatsoever.

EXAMPLE XXIX

The first zone of the same apparatus as in the preceding example contained as catalyst fluorinated alumina covered with 1% carbon. The second zone contained alumina activated at 450° C. and fluorinated below 250° C.

EXAMPLES XXX–XXXIV

In order to determine the influence of the molar ratio of recycling mixture to starting hydrocarbons at the reaction zone, a mixture of hydrogen fluoride, chlorine, methane and a mixture of halogenated hydrocarbons was fed into a single-zone fluid-bed reactor, which contained a catalyst constituted of carbon impregnated with 10% of $AlF_3$. The halogenated hydrocarbon mixture composition, by weight, was:

| | Percent |
|---|---|
| $CCl_4$ | 50 |
| $CFCl_3$ | 50 |

The molar ratio of the halogenated hydrocarbons mixture (recycling mixture) to the nonhalogenated aliphatic hydrocarbons is given in the following table from which the conversion and the yield of the process will also be apparent. The reaction temperature was 470° C. and the contact time 3 seconds.

| Example | XXX | XXXI | XXXII | XXXIII | XXXI |
|---|---|---|---|---|---|
| Recycling mixture/$CH_4$ | 0 | 0.5 | 1.1 | 2.8 | 5.9 |
| $Cl_2$/HF/$CH_4$ | 4/1.9/1 | 4/1.9/1 | 4.1/1.9/1 | 4.1/2.2/1 | 4/1.9/1 |
| Conversions, percent: | | | | | |
| HF | 53 | 69 | 83 | 88 | 94 |
| $Cl_2$ | 96 | 95 | 98 | 95 | 97 |
| $CH_4$ | 99 | 99 | 98 | 99 | 99 |
| Net yield, percent: | | | | | |
| $CF_3Cl$ | 1 | 0.5 | 0.3 | 0.3 | 0 |
| $CF_2Cl_2$ | 21 | 41 | 65 | 71 | 93 |
| $CFCl_3$ | 31 | 52 | 34 | 29 | 7 |

The accompanying drawing demonstrates the characteristics of the process of the present invention in terms of their dependence upon the molar ratio of recycled halogenated-hydrocarbon mixture to input nonhalogenated hydrocarbon. In the drawing:

FIG. 1 is a graph of the conversion of hydrogen fluoride to the fluorinated hydrocarbon plotted along the ordinate in percent against the molar ratio of recycled halogenated hydrocarbon to nonhalogenated hydrocarbon plotted along the abscissa;

FIG. 2 is a graph of the net yield of difluorodichloromethane, one of the most desirable products of the process of the present invention, plotted in percent as the ordinate against the molar ratio plotted along the abscissa; and FIG. 3 is a graph of the hourly rate of production, in moles, of fluorinated chloromethanes per liter of catalyst (a measure of reaction efficiency) plotted along the ordinate against the molar ratio plotted along the abscissa.

To determine the influence of molar ratio, as described above, a mixture of hydrogen fluoride, chlorine, methane and equal parts of carbontetrachloride and trichlorofluoromethane (as recycled halogenated hydrocarbon component) was reacted as previously described in a fluidized-bed reactor at a temperature of 470° C., with a catalyst contact time of three seconds and a carbon-supported fluorinated-alumina catalyst. The molar ratios of chlorine and hydrogen fluoride to methane were maintained close to 4:1 and 2:1, respectively, while the molar ratio of recycled hydrocarbons to methane was varied as indicated by the abscissa in FIGS. 1 and 2. These graphs demonstrate that up to a molar ratio of substantially 1:1 a sharp increase in both the hydrogen-fluoride conversion and the yield of the most desirable product occurs, molar ratios of somewhat less than 1:1 being effective with, however, materially reduced conversions and yields.

From FIG. 3 it will be seen that molar ratios considerably in excess of 10:1 are characterized by a substantially reduced plant efficiency since, above this ratio, the hourly production of chlorofluoromethanes per liter of catalyst merely results in an uneconomical use of the reactor.

EXAMPLE XXXV

Some granulated alumina was ground and sieved; the fraction comprised between 48 and 325 mesh (Tyler series) was treated for 3 hours with air at 500° C. at an air speed of 8 cm. per second. The catalyst was then cooled down to 150° C. and treated with a current of nitrogen and hydrogen fluoride until a complete fluorination was achieved; during this operation the temperature of the catalyst may not exceed 250° C. Thereupon, 218 cc. of the product obtained was loaded into a fluid-bed reactor.

Reaction conditions and results are tabulated.

As can be seen, under these conditions the $CF_3Cl$, which in the standard production of chlorofluoromethane is considered as a by-product, was obtained in considerable quantities.

EXAMPLE XXXVI 120 cc. of the catalyst prepared according to the preceding tests were loaded into the second stage of a fluidized-bed reactor in the first stage of which were contained 240 cc. of coal marketed under the trademark "Lurgi KT4" and having a granulometric size comprised between 35 and 60 mesh (Tyler series).

EXAMPLE XXXVII

In an apparatus substantially identical with that of the preceding example, 120 cc. of the usual catalyst were loaded into the second stage while into the first stage were put 240 cc. of the same catalyst but activated by a long period of operation at high temperatures.

In this case, too, the production of $CF_3Cl$ was reduced to more than one-tenth of that of Example XXXV.

From Examples XXXV–XXXVII it will be understood that the same catalyst composition can yield different product mixtures with orientation toward the production of greater quantities of one product and lesser quantities of another merely as a consequence of its use in either a single-zone reaction or in a multiple-zone system. Whereas in Example XXXV the fluorinated alumina was employed in a single-stage reaction and yielded considerable quantities of trifluorochloromethane, a less desirable product having a higher degree of fluorination, the same catalyst used in the second stage, in accordance with Example XXXVI, resulted in a ten-fold decrease in the yield of the trifluorinated product and a corresponding increase in the yield of the monofluorinated product. A similar result was obtained, using the same catalyst, in the two-stage process of Example XXXVII.

EXAMPLE XXXVIII

The equipment used for the chloro-fluorination reaction substantially consisted of two metal reactors disposed in series and of a distillation column, both apparatuses suitable for operating under pressure.

Into the first metal reactor containing 372 cc. of activated carbon of a size from 48 to 65 mesh, supported by a porous metal plate, and kept at a temperature of 470° C., was introduced at a pressure of 4 kg./cm.² a gaseous mixture consisting of chlorine, hydrofluoric acid, methane and a recycling mixture of halohydrocarbons, according to the following molar ratios:

| | Moles |
|---|---|
| Chlorine | 4.09 |
| Hydrofluoric acid | 1.58 |
| Methane | 1 |
| Recycling mixture of halo-hydrocarbons | 5.8 |

The recycling mixture of halo-hydrocarbons had the following molar composition:

| | Moles percent |
|---|---|
| $CCl_4$ | 61.3 |
| $CFCl_3$ | 35.6 |
| $CHCl_3$ | 1.9 |
| $CF_2Cl_2$ | 0.1 |
| $CH_2Cl_2$ | 0.08 |
| $CHFCl_2$ | 0.01 |
| $C_2Cl_4$ | 0.3 |

The contact time of the gases in the catalyst zone was of 1.76 seconds.

The gaseous mixture coming out of the reactor was then conveyed to the second metal reactor which contained 220 cc. of fluorinated alumina of an 80 to 150 mesh size and was maintained at 235° C.

The contact time of the gases in the second catalysis zone was 1.44 seconds. At the outlet of the second reactor, the gaseous mixture was introduced into a distillation column whose top was cooled by brine at about −10° C. At the bottom of the column, a liquid mixture of products was collected which was then drawn out by a metering pump, evaporated and recycled as a recycling mixture, while from the head of the column a gaseous mixture was withdrawn. This gaseous mixture represented the raw reaction material which was subjected to washing and subsequent fractional condensation.

The molar composition of the mixture of the reaction products emerging from the top of the column was:

| | Moles percent |
|---|---|
| HCl | 83.23 |
| HF | 0.22 |
| $Cl_2$ | 1.29 |
| $CF_3Cl$ | 0.14 |
| $CF_2Cl_2$ | 8.18 |
| $CFCl_3$ | 6.40 |
| $CHCL_3$ | 0.01 |
| $CH_4$ | 0.12 |

The conversions of the various reagents and the yields in chloro-fluorinated products calculated with respect to the converted methane were:

| Conversion of: | Percent |
|---|---|
| $CH_4$ | 99 |
| $Cl_2$ | 97.9 |
| HF | 99 |

| Net yields in: | |
|---|---|
| $CF_3Cl$ | 1 |
| $CF_2Cl_2$ | 55 |
| $CFCl_3$ | 43 |

The procuctivity of the catalyst was of 7.22 moles of chloro-fluorocarbons per liter of catalyst per hour.

EXAMPLE XXXIX

Using the same equipment as that described in Example XXXVIII, a comparative test at atmospheric pressure was carried out. The composition of the recycling mixture and the molar ratios of the reagents were the same as those recorded in Example XXXVII. Pressure was 764 mm./Hg.

The temperature of the first reactor was 470° C. and the contact time was 1.49 seconds. The temperature of the second reactor was 230° C. and the contact time was 1 second.

The top of the columns was cooled by trichloroethylene and Dry Ice at about −35° C.

Conversion and yields were obtained which were practically equal to those recorded in Example XXXVIII. The productivity of the catalyst was 2.02 moles of chloro-fluorocarbons per liter of catalyst per hour.

EXAMPLE XL

In a reactor, containing 412 cc. of activated carbon impregnated with 15% of $AlF_3$ and 2% of $ThF_4$ and having a mesh size of from 28 to 80 mesh, a gaseous mixture consisting of chlorine, hydrofluoric acid, methane and a gaseous recycling mixture, in the following molar ratios:

| | Moles |
|---|---|
| Chlorine | 4.13 |
| Hydrofluoric acid | 1.62 |
| Methane | 1.0 |
| Gaseous recycling mixture | 5.85 | was introduced at a pressure of 6 kg./cm.$^2$.

The gaseous recycling mixture was of the following molar composition:

| | Moles percent |
|---|---|
| $CCl_4$ | 54.3 |
| $CHCl_3$ | 0.2 |
| $CH_2Cl_2$ | 0.07 |
| $CFCl_3$ | 44.6 |
| $CF_2Cl_2$ | 0.1 |
| $CHFCl_2$ | 0.3 |
| $C_2Cl_4$ | 0.08 |
| $C_2Cl_6$ | 0.01 |

The temperature of the reactor was 465° C., while the contact time of the gases in the catalyst zone was 2.57 seconds. The reaction products at the output of the reactor, still at a pressure of 6 kg./cm.$^2$, were introduced into a distillation column suited for operation under pressure and having its top cooled by cold water at about 0° C. From the bottom of the column, the recycle mixture was collected and then drawn out by a metering pump, evaporated and again recycled. From the top of the column emerged a mixture of reaction products showing the following molar composition:

| | Moles percent |
|---|---|
| HCl | 81.89 |
| HF | 0.94 |
| $Cl_2$ | 2.41 |
| $CF_3Cl$ | 0.10 |
| $CF_2Cl_2$ | 7.77 |
| $CFCl_3$ | 6.68 |
| $CHCl_3$ | 0.01 |
| $CH_4$ | 0.14 |
| $CHF_2Cl$ | 0.01 |

The conversion of the reagents and the yields of the chloro-fluorinated products calculated with respect to the converted methane were:

| Conversion of: | Percent |
|---|---|
| $CH_4$ | 99 |
| $Cl_2$ | 96 |
| HF | 96 |

| Net yields in: | |
|---|---|
| $CF_3Cl$ | 0.8 |
| $CF_2Cl_2$ | 53.2 |
| $CFCl_3$ | 45.8 |

The productivity the catalyst was of 11.9 moles of chloro-fluorocarbons per liter of catalyst per hour.

EXAMPLE XLI

The test described in Example XL was repeated for a comparison by operating under atmospheric pressure, more precisely, at 765 mm./Hg.

The composition of the recycling mixture, the molar ratios of the reacting substances and the reaction temperature were all the same as in Example XL, while the contact time was 2 seconds. The conversion and net yields were practically the same as those obtained in Example XL. The top of the column was cooled by trichloroethylene and Dry Ice at about −35° C.

The productivity of the catalyst was 2.31 moles of chloro-fluorocarbons per liter of catalyst per hour.

We claim:
1. A continuous process for the conversion of methane into a product consisting essentially of monofluorotrichloromethane and dichlorodifluoromethane, comprising the steps of:
  (a) continuously passing a stream of methane, chlorine, hydrogen fluoride and from 1 to 15 moles per mole of methane of a recycle mixture of at least partially chlorinated and of partially fluorinated methanes consisting predominantly of $CCl_4$, $CFCl_3$, $CHCl_3$, $CH_2Cl_2$, $CHCl_2F$, the proportion of $CCl_4$ and $CFCl_3$ amounting together to at least 60% by weight of the mixture, the molar hydrogen-fluoride:methane ratio being up to substantially 2:1, through a reaction zone over a solid catalyst selected from the group consisting of activated carbons, supported and unsupported salts and oxides of chromium, nickel, cobalt, aluminum, gallium, vanadium, zirconium, thorium, zinc, iron, palladium, copper, bismuth and lead, and mixtures thereof, at a temperature ranging between 180° C. and 700° C. and for a catalyst-contact time ranging between 0.1 and 30 seconds to convert said stream into a reaction-products mixture, and
  (b) continuously separating the reaction-products mixture into a recycle mixture, substantially equal in amount and composition to the recycle mixture passed over the catalyst together with methane, chlorine, and hydrogen fluoride in step (a), and into a product consisting essentially of the desired mono- and difluorochloromethanes.

2. A continuous process according to claim 1 carried out at a pressure ranging from 2 to 15 kg. per cm.$^2$.

3. A continuous process according to claim 1 wherein said stream is passed over the catalyst through two consecutive reaction zones maintained at different temperatures.

4. The process of claim 1 in which the temperature throughout the reaction zone ranges between substantially 400 and 500° C.

References Cited

UNITED STATES PATENTS

| | | | |
|---|---|---|---|
| 2,024,095 | 12/1935 | Daudt et al. | 260—653.7 |
| 2,407,129 | 9/1946 | Benning et al. | 260—653.7 |
| 2,458,551 | 1/1949 | Benning et al. | 260—653.7 |
| 2,946,827 | 7/1960 | Belf | 260—653.7 |

FOREIGN PATENTS 622,167    3/1963    Belgian.

DANIEL D. HORWITZ, *Primary Examiner.*

UNITED STATES PATENT OFFICE
CERTIFICATE OF CORRECTION

Patent No. 3,442,962              Dated May 6, 1969

Inventor(s) Martino Vecchio, Italo Cammarata and Luciano Lodi

It is certified that error appears in the above-identified patent and that said Letters Patent are hereby corrected as shown below:

In the heading

---Claims priority, application Italy, September 11, 1961, 16,368/61, Patent 665,278---

Signed and sealed this 25th day of May 1971.

(SEAL)
Attest:

EDWARD M. FLETCHER, JR.                WILLIAM E. SCHUYLER, JR.
Attesting Officer                       Commissioner of Patents